(12) United States Patent
Babbage et al.

(10) Patent No.: US 12,736,437 B2
(45) Date of Patent: Sep. 15, 2026

(54) PIXEL HEADLAMP AIMING

(71) Applicant: Ford Global Technologies, LLC, Dearborn, MI (US)

(72) Inventors: Jason Michael Babbage, Allen Park, MI (US); Matthew W. Roosen, Memphis, MI (US); William Clay Priddy, Clarkson, KY (US); Venkatesh Krishnan, Canton, MI (US); Ryan Nicholas Garvey, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 18/751,596

(22) Filed: Jun. 24, 2024

(65) Prior Publication Data

US 2025/0389618 A1 Dec. 25, 2025

(51) Int. Cl.

| | |
|---|---|
| ***F21S 41/275*** | (2018.01) |
| ***F21S 41/151*** | (2018.01) |
| ***G01M 11/06*** | (2006.01) |
| ***H05B 47/155*** | (2020.01) |
| *F21Y 115/10* | (2016.01) |

(52) U.S. Cl.

CPC ......... *G01M 11/064* (2013.01); *F21S 41/151* (2018.01); *F21S 41/275* (2018.01); *H05B 47/155* (2020.01); *F21Y 2115/10* (2016.08)

(58) Field of Classification Search

CPC .... G01M 11/064; F21S 41/275; F21S 41/151; H05B 47/155; F21Y 2115/10

See application file for complete search history.

(56) References Cited

U.S. PATENT DOCUMENTS

| | | | | |
|---|---|---|---|---|
| 2012/0069593 | A1* | 3/2012 | Kishimoto | B60Q 1/076 362/280 |
| 2017/0315017 | A1* | 11/2017 | Ekladyous | G01M 11/061 |
| 2024/0308418 | A1* | 9/2024 | Watanabe | F21S 41/153 |

FOREIGN PATENT DOCUMENTS

| | | | |
|---|---|---|---|
| CN | 107585089 | A | 1/2018 |
| CN | 213040510 | U | 4/2021 |
| DE | 102014001201 | A1 | 7/2015 |
| JP | 2016207430 | A | 12/2016 |
| JP | 2020061232 | A | 4/2020 |
| KR | 20220011393 | A | 1/2022 |
| WO | 2023163437 | A1 | 8/2023 |

* cited by examiner

*Primary Examiner* — Jamil Ahmed

(74) *Attorney, Agent, or Firm* — Vichit Chea; Carlson, Gaskey & Olds, P.C.

(57) ABSTRACT

A system and method include providing at least one headlamp that includes a plurality of pixels, determining a headlamp optical center nominal target of the at least one headlamp based on at least one measured vehicle characteristic, and activating a predefined beam pattern comprising a reduced number of pixels from the plurality of pixels. The system and method further include adjusting headlamp aim to the headlamp optical center nominal target; and deactivating the predefined beam pattern.

23 Claims, 3 Drawing Sheets

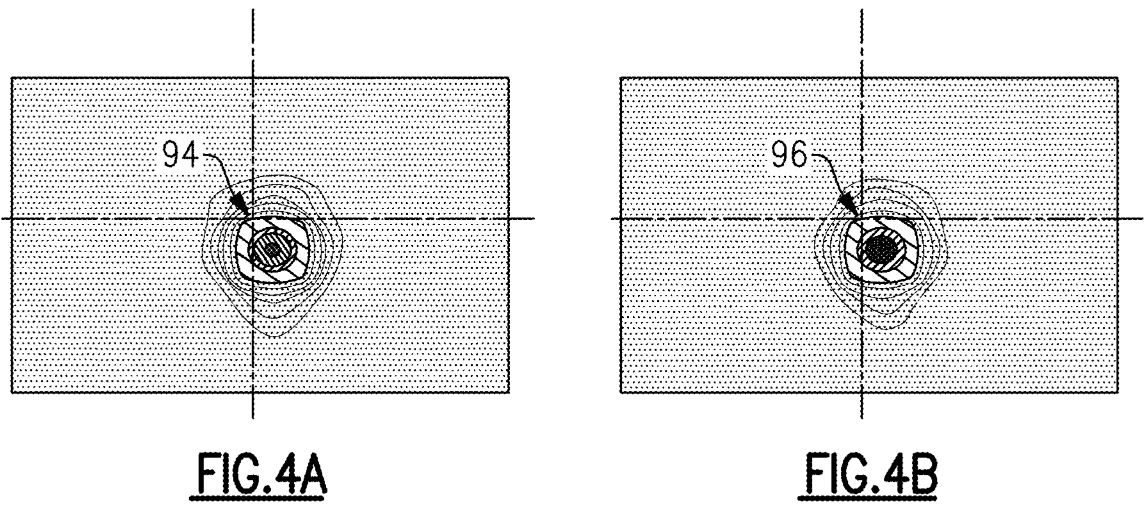
FIG.4A
FIG.4B
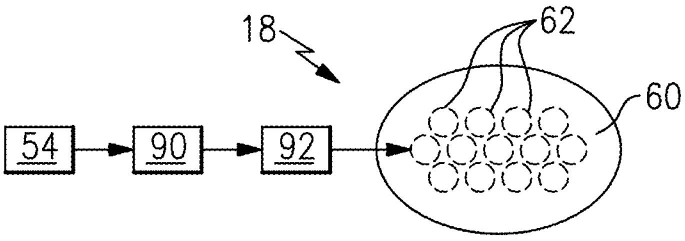
FIG.5

PIXEL HEADLAMP AIMING

TECHNICAL FIELD

This disclosure relates generally to determining an optical center for a headlamp in combination with activating one pixel or a subset of pixels of the headlamp, which are then used to adjust headlamp aim.

BACKGROUND

Vehicles include many different types of lamp assemblies, such as headlamps for example. These lamps must be adjusted during assembly of the vehicle to ensure that the aim of the lamps is within a specified target range.

SUMMARY

A method according to an exemplary aspect of the present disclosure includes, among other things: providing at least one headlamp that includes a plurality of pixels; determining a headlamp optical center nominal target of the at least one headlamp based on at least one measured vehicle characteristic; activating a predefined beam pattern comprising a reduced number of pixels from the plurality of pixels; adjusting headlamp aim to the headlamp optical center nominal target; and deactivating the predefined beam pattern.

In a further non-limiting embodiment of any method, the predefined beam pattern comprises a low beam pattern.

In a further non-limiting embodiment of any method, the reduced number of pixels comprises a single pixel.

In a further non-limiting embodiment of any method, the reduced number of pixels comprises a subset of pixels that is a number of pixels that is less than all of the plurality of pixels.

In a further non-limiting embodiment of any method, each pixel of the plurality of pixels comprises a LED.

In a further non-limiting embodiment of any method, each LED is individually configurable.

In a further non-limiting embodiment of any method, the method includes providing a LED driver module operable with electronic based communication to control the predefined beam pattern.

In a further non-limiting embodiment of any method, the method includes adjusting the headlamp aim to the headlamp optical center nominal target which comprises a vertical coordinate and a horizontal coordinate that is a predetermined distance from a front of a vehicle.

In a further non-limiting embodiment of any method, the predetermined distance is approximately twenty-five feet.

In a further non-limiting embodiment of any method, the at least one measured vehicle characteristic comprises at least one measured front fender characteristic, and the method includes determining the headlamp optical center nominal target for the at least one headlamp based on the at least one measured front fender characteristic.

In a further non-limiting embodiment of any method, the at least one measured front fender characteristic comprises at least a measured distance from ground to an uppermost point of a wheel arch of a front fender.

In a further non-limiting embodiment of any method, the method includes using a ride height measurement device to measure the measured distance.

In a further non-limiting embodiment of any method, the ride height measurement device comprises at least one camera.

In a further non-limiting embodiment of any method, the at least one headlamp comprises a front right headlamp and a front left headlamp, and the method includes adjusting aim for the front right headlamp based on the measured distance for a front right fender and adjusting aim for the front left headlamp based on the measured distance for a front left fender.

A system according to an exemplary aspect of the present disclosure includes, among other things: at least one headlamp that includes a plurality of pixels; a measurement device that measures at least one front fender characteristic; and one or more controllers that are configured to: determine a headlamp optical center nominal target of the at least one headlamp based on the at least one front fender characteristic; activate a predefined beam pattern comprising a reduced number of pixels from the plurality of pixels; adjust headlamp aim to the headlamp optical center nominal target; and deactivate the predefined beam pattern.

In a further non-limiting embodiment of any system, the predefined beam pattern comprises a low beam pattern.

In a further non-limiting embodiment of any system, the reduced number of pixels comprises a single pixel.

In a further non-limiting embodiment of any system, the reduced number of pixels comprises a subset of pixels that is a number of pixels that is less than all of the plurality of pixels.

In a further non-limiting embodiment of any system, each pixel of the plurality of pixels comprises a LED.

In a further non-limiting embodiment of any system, each LED is individually configurable, and a LED driver module is operable with electronic based communication to control the predefined beam pattern via the one or more controllers.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 4A is a schematic representation of a single pixel aiming distribution on a left hand side.

FIG. 4B is a schematic representation of a single pixel aiming distribution on a left hand side.

FIG. 5 is a schematic representation of a headlamp with a lens in front of a plurality of pixels.

DETAILED DESCRIPTION

This disclosure details a system and method for determining an optical center for a headlamp based on an individually measured front fender characteristic, in combination with activating one pixel or a subset of pixels from a plurality of headlamp pixels, which are then used to adjust headlamp aim.

Figure 1:
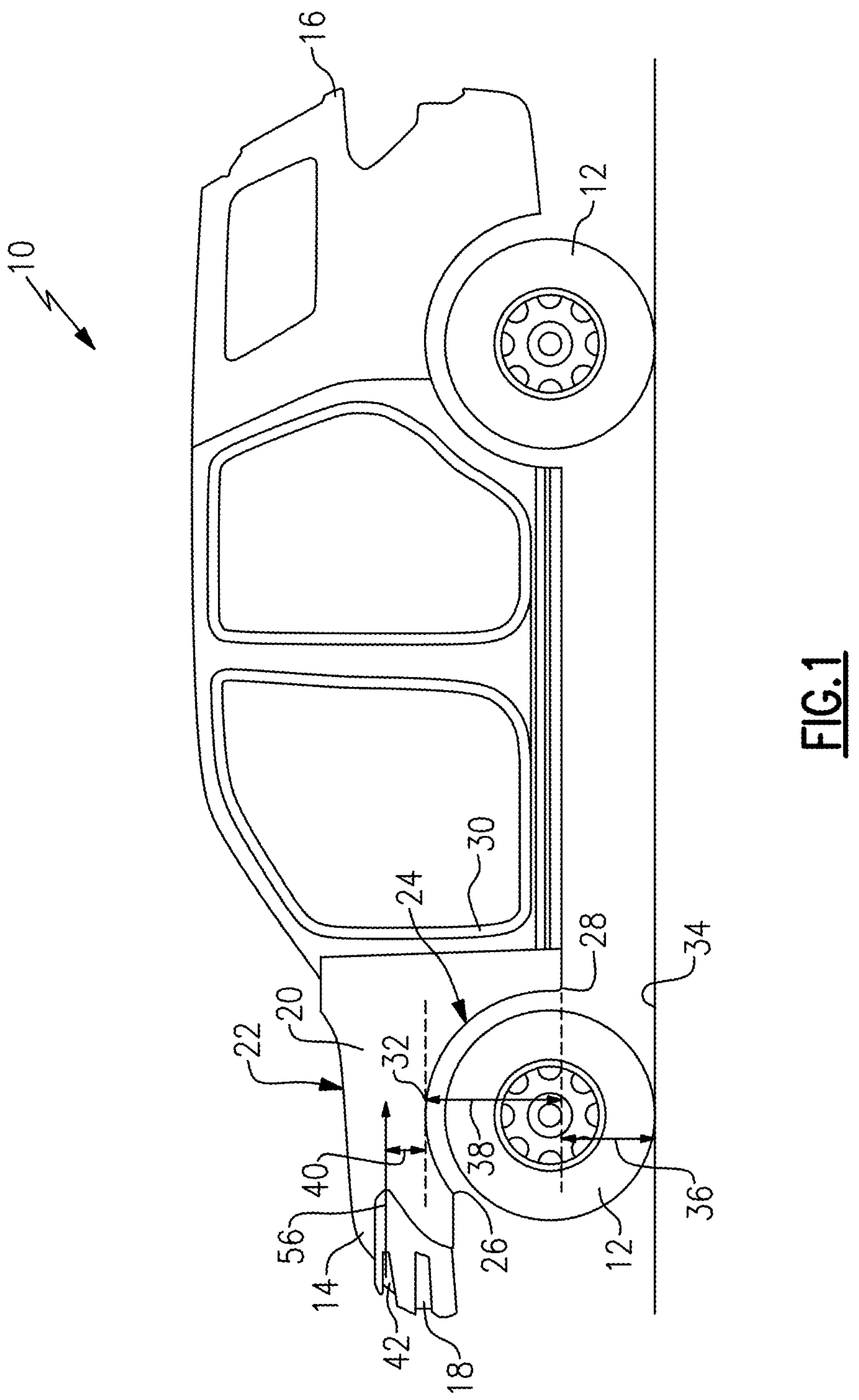
FIG. 1 illustrates a side view of a vehicle.

With reference to FIG. 1, a vehicle 10 is supported by a plurality of wheels 12 and extends from a front end 14 to a rear end 16. Headlamps 18 (FIGS. 1 and 3) are located at the front end 14 of the vehicle 10. The vehicle 10 includes a front fender 20 at each side that extends downwardly from a hood 22, and which also extends around the associated wheel 12. Each fender 20 has an arch 24 that extends in a direction along a length of the vehicle, e.g., a longitudinal direction, from a front fender end 26 near the headlamp 18 to a rear fender end 28 near an occupant door opening 30.

In one example, the arch 24 comprises a curvature, e.g., a curved surface, that extends from the front fender end 26 to the rear fender end 28. In implementations, the rear fender end 28 defines a lowest point of the arch 24 and an uppermost point 32 of the arch 24 is a distance that is furthest from ground level 34. In implementations, a first dimension 36 is measured from ground level 34 to the lowest-most point of the arch 24 at the rear fender end 28, and a second distance 38 is measured from the lowest-most point of the arch 24 to the uppermost point 32 of the arch 24, e.g., an arch height. A third dimension 40 is a known distance from the uppermost point 32 of the arch 24 to a known optical center location 42 of the headlamp 18. A fourth dimension 56 is a fore/aft distance from the known optical center location 42 to the uppermost point 32 of the arch 24.

In implementations, each headlamp 18 is comprised of a lens 60 (FIG. 5) and a plurality of pixels 62. In one example, the lens 60 comprises a Fresnel lens; however, other types of lenses could also be used. In one example, the pixels 62 each comprise a LED or other similar light source.

Current aiming and audit systems in manufacturing plants may have limitations due to using a Fresnel lens for aiming. A Fresnel lens is a type of composite compact lens that reduces an amount of material required compared to a conventional lens by dividing the lens into a set of concentric annular sections. This design allows the construction of lenses of large aperture and short focal length without the mass and volume of material that would be required by a lens of conventional design. Thus, a Fresnel lens can be made much thinner than a comparable conventional lens. Because a full beam pattern is traditionally used to measure the gradient, and as the Fresnel lens is very close to the headlamp, different lights of the headlamp such as foreground modules, accent light, parking lights, etc., may cause an un-desired effect on the measurement of the beam pattern. When an aimed pattern is compared to an audit pattern, which is measured at twenty-five feet for example, often conditions are not similar between the two measurement proximities and this may cause issues with aiming capability.

The subject disclosure provides for headlamp aim and audit equipment to command a single or multi-pixel beam pattern ON for measurement instead of using a full beam pattern. The aim equipment can center the Fresnel lens on the headlamp center more consistently with less interference from other lighting features with a single or multi-pixel set up, such that the headlamp will display a consistent and finite beam pattern to the headlamp aim equipment that best correlates to the same beam pixel or multi-pixel pattern at the headlamp audit equipment. This this consistency provides an increase in aim and audit measurement capability.

In implementations, a system and method include providing at least one headlamp that includes a plurality of pixels; determining a headlamp optical center nominal target of the at least one headlamp based on at least one measured vehicle characteristic; activating a predefined beam pattern comprising a reduced number of pixels from the plurality of pixels; adjusting headlamp aim to the headlamp optical center nominal target; and deactivating the predefined beam pattern.

Figures 2, 3:
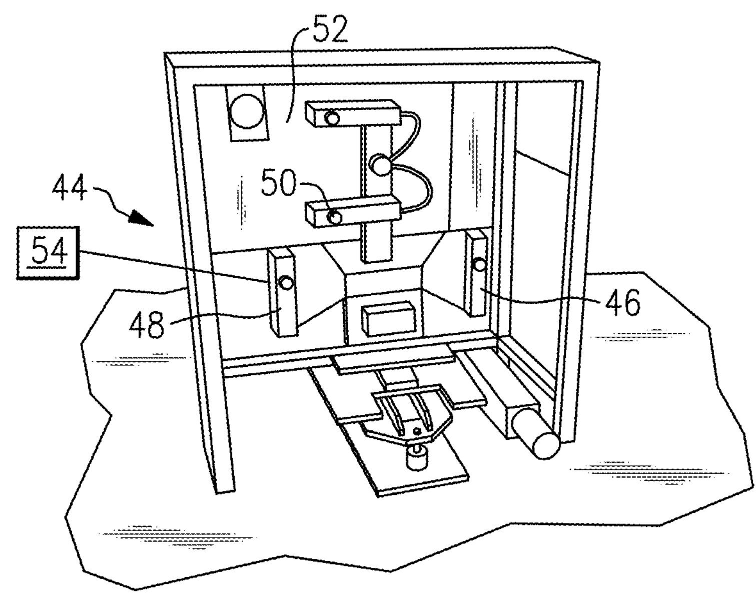
FIG. 2 is a front view of a measurement device.
FIG. 3 is a schematic illustration of adjustment of headlamps to an aim distance at a predetermined length from a front of the vehicle.

FIG. 2 shows one example of a measurement device 44 used in a manufacturing plant to make various vehicle measurements. In one example, the measurement device 44 comprises a ride height measurement device used at a wheel alignment and headlamp aiming station. In implementations, the measurement device 44 comprises at least: a first camera 46 that comprises a fore wheel camera that measures a first wheel alignment characteristic; a second camera 48 that comprises an aft wheel camera that measures a second wheel alignment characteristic; a third camera 50 that comprises a wheel camber camera that measures a third wheel alignment characteristic; and a fourth camera 52 that comprises a vehicle ride height measurement camera that measures ride height at the fender arch/wheel lip for headlamp aiming.

In implementations, the disclosed system and method utilizes dimensions from the height measurement device in combination with a known fender versus headlamp designed relationship to calculate the headlamp optical center nominal target of the headlamp 18 that will be used for final aim adjustment per each individual vehicle 10. In one example, one or more controllers 54 are associated with the measurement device 44. The one or more controllers 54 receive measurement data and have access to stored data and vehicle design characteristics, which are used to calculate the horizontal and vertical coordinates for the headlamp optical center nominal target.

In implementations, the one or more controllers 54 may include a processor, memory, and one or more input and/or output (I/O) device interface(s) that are communicatively coupled via a local interface. The local interface can include, for example but not limited to, one or more buses and/or other wired or wireless connections. The controller 54 may be a hardware device for executing software, particularly software stored in memory. The controller 54 can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The software in the memory may include one or more separate programs, each of which includes an ordered listing of executable instructions for implementing logical functions. Any of various Input/Output devices may be coupled to system I/O interface(s). The controller 54 can be configured to execute software stored within the memory, to communicate data to and from the memory, and to generally control operations of the computing device pursuant to the software. Software in memory, in whole or in part, is read by the processor, perhaps buffered within the processor, and then executed.

The subject disclosure provides for a single or multi-pixel pixel aiming solution for a low beam pattern. In implementations, inputs to the system include: a headlamp ECU (LED Driver Module (LDM)) with a configurable beam pattern; a headlamp ECU (LED Driver Module (LDM)) with electronic based communication; headlamp low beam function with light emitting system with individually configurable LEDs, e.g., pixels; and LDM software configuration files configured with only multiple LEDs on in the configurable beam pattern.

FIG. 3 shows one example of headlamp aim adjustment at a predetermined distance 64 from the front end 14 of the vehicle 10. In one example, the predetermined distance 64 is twenty-five feet; however, other distances could also be used. FIG. 3 shows a single pixel aiming diagram where a single pixel 62 is to be aimed relative to a low beam optical center 42 (fiduciary mark). The optical center location 42 on each headlamp 18, e.g. the fiduciary mark, is a known value based on vehicle geometry.

In implementations, the measurement device 44 measures defined vehicle characteristics then utilizes defined vehicle geometry to calculate the vertical and horizontal coordinates of a headlamp center position as a nominal target that is projected outward at the predetermined distance. A distance from the optical center location 42 to the ground level 34 is shown at 66 in FIG. 3. A centerline dimension 68 extends from the optical center location 42 to intersect a vertical line 70 at the predetermined distance. A first horizontal line 72 extends from the vertical line 70 intersection with the centerline dimension 68 to be parallel with a ground level 34. An offset horizontal line 74 is spaced from the first horizontal line 72 by an offset distance 76. Reference number 78 shows an inclination of a cut-off line beginning on line 70. An area 80 is defined between upper and lower boundaries and a pixel distribution from aiming of a pixel 62 is shown at 82. A vertical distance from the offset horizontal line 74 to ground level 34 is shown at 84.

Once the nominal target is identified, the controller 54 commands the headlamp module 18 to display a single pixel or a multiple pixel beam pattern for vehicle optical adjustment. The desired configuration for the beam pattern is enabled through electronic based commands between a headlamp controller 90, e.g. ECU, and a LED driver module 92 (LDM) associated with the pixels 62. The controller 54 may command the headlamp controller 90 or the controllers could be integrated together. Any type of LDM 92 can be used to individually configure each pixel 62.

In the example shown in FIG. 3, the headlamp low beam pattern is activated as a single pixel beam. The system controller 54 then uses the calculated lamp center positions for each headlamp 18 as a nominal target. An operator and or associated control equipment then adjusts the aim of the headlamps to the calculated vertical (Z) and horizontal (Y) target. Once the aiming procedure has been completed, the beam pattern configuration is deactivated through an electronic command to the one or more controllers.

FIG. 4A shows an example of a pixel distribution from aiming of a pixel 62 for a left hand side. The low beam optical center (e.g., fiduciary mark) is shown at 94.

FIG. 4B shows an example of a pixel distribution from aiming of a pixel 62 for a right hand side. The low beam optical center (e.g., fiduciary mark) is shown at 96.

With regard to the a headlamp optical center nominal target based on at least one measured vehicle characteristic, various procedures can be used for measurement purposes. In implementations, the measured vehicle characteristic may comprise a front fender characteristic.

In one example, each vehicle would enter an aiming station within a manufacturing facility where the associated inputs would be identified for that vehicle. For example, vehicle type, lamp type, and defined front X/Z fender geometry constants would be identified for that vehicle. As known, the X direction refers to a direction along a length of a vehicle, the Y direction refers to a direction along a width of the vehicle, and the Z direction refers to a direction along a height of the vehicle.

Next, the measurement device 44 measures defined vehicle characteristics and then utilizes the defined vehicle geometry to calculate the vertical and horizontal coordinates of the headlamp center position. For example, the measurement device 44 uses the fourth camera 52 to measure front fender ground to wheel arch dimensions for each side, and then the controller 54 calculates the headlamp optical center position in Y/Z directions based on the known geometry design constants for that vehicle type.

The measurement device 44 then positions itself to a horizontal coordinate (Y) (considered a constant from a vehicle center) and to the calculated (Z) vertical coordinate. In implementations, this Y/Z position comprises a reference target point. Next, the system activates the desired beam pattern and then aiming can be adjusted to the correct location at the predetermined distance.

In certain implementations, the system may also additionally determine vertical and horizontal nominal target positions per each headlamp using the system inputs and the measured geometry and by applying a given aim bias value. An example method for using an aim bias value is set forth in application Ser. No. 18/751,577 filed concurrently with the subject application, which are owned by the same assignee and is incorporated herein in its entirety.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A method, comprising:

providing at least one headlamp that includes a plurality of pixels;

determining a headlamp optical center nominal target of the at least one headlamp based on at least one measured vehicle characteristic that comprises at least one measured front fender characteristic;

determining the headlamp optical center nominal target for the at least one headlamp based on the at least one measured front fender characteristic;

activating a predefined beam pattern comprising a reduced number of pixels from the plurality of pixels;

adjusting headlamp aim to the headlamp optical center nominal target; and deactivating the predefined beam pattern.

2. The method according to claim 1, wherein the predefined beam pattern comprises a low beam pattern.

3. The method according to claim 2, wherein the reduced number of pixels comprises a single pixel.

4. The method according to claim 2, wherein the reduced number of pixels comprises a subset of pixels that is a number of pixels that is less than all of the plurality of pixels.

5. The method according to claim 2, wherein each pixel of the plurality of pixels comprises a LED.

6. The method according to claim 5, wherein each LED is individually configurable.

7. The method according to claim 6, including providing a LED driver module operable with electronic based communication to control the predefined beam pattern.

8. The method according to claim 2, including adjusting the headlamp aim to the headlamp optical center nominal target which comprises a vertical coordinate and a horizontal coordinate that is a predetermined distance from a front of a vehicle.

9. The method according to claim 8, wherein the predetermined distance is approximately twenty-five feet.

10. The method according to claim 1, wherein the at least one measured front fender characteristic comprises at least a measured distance from ground to an uppermost point of a wheel arch of a front fender.

11. The method according to claim 10, including using a ride height measurement device to measure the measured distance.

12. The method according to claim 11, wherein the ride height measurement device comprises at least one camera.

13. The method according to claim 10, wherein the at least one headlamp comprises a front right headlamp and a front left headlamp, and including adjusting aim for the front right headlamp based on the measured distance for a front right fender and adjusting aim for the front left headlamp based on the measured distance for a front left fender.

14. A system comprising:

at least one headlamp that includes a plurality of pixels;

a measurement device that measures at least one front fender characteristic; and one or more controllers that are configured to:

determine a headlamp optical center nominal target of the at least one headlamp based on the at least one front fender characteristic;

activate a predefined beam pattern comprising a reduced number of pixels from the plurality of pixels;

adjust headlamp aim to the headlamp optical center nominal target; and deactivate the predefined beam pattern.

15. The system according to claim 14, wherein the predefined beam pattern comprises a low beam pattern.

16. The system according to claim 15, wherein the reduced number of pixels comprises a single pixel.

17. The system according to claim 15, wherein the reduced number of pixels comprises a subset of pixels that is a number of pixels that is less than all of the plurality of pixels.

18. The system according to claim 15, wherein each pixel of the plurality of pixels comprises a LED.

19. The system according to claim 14, wherein each LED is individually configurable, and including a LED driver module that is operable with electronic based communication to control the predefined beam pattern via the one or more controllers.

20. The system according to claim 14, wherein the at least one front fender characteristic comprises a plurality of front wheel characteristics, and wherein the measurement device comprises a ride height measurement device with a plurality of cameras that measure the plurality of front wheel characteristics, and wherein the one or more controllers are configured to utilize dimensions from the ride height measurement device in combination with a known fender versus headlamp designed relationship to calculate the headlamp optical center nominal target of the at least one headlamp used for final aim adjustment per each individual vehicle.

21. The system according to claim 20, wherein the plurality of cameras comprise at least:

a first camera that comprises a fore wheel camera that measures a first wheel alignment characteristic;

a second camera that comprises an aft wheel camera that measures a second wheel alignment characteristic;

a third camera that comprises a wheel camber camera that measures a third wheel alignment characteristic; and a fourth camera that comprises a vehicle ride height measurement camera that measures ride height at a fender arch or wheel lip for headlamp aiming.

22. The method according to claim 1, wherein the at least one measured front fender characteristic comprises a plurality of measured front wheel characteristics measured by a ride height measurement device with a plurality of cameras to determine the plurality of measured front wheel characteristics, and including:

utilizing dimensions from the ride height measurement device in combination with a known fender versus headlamp designed relationship to calculate the headlamp optical center nominal target of the at least one headlamp used for final aim adjustment per each individual vehicle.

23. The method according to claim 22, wherein the plurality of cameras comprise at least:

a first camera that comprises a fore wheel camera that measures a first wheel alignment characteristic;

a second camera that comprises an aft wheel camera that measures a second wheel alignment characteristic;

a third camera that comprises a wheel camber camera that measures a third wheel alignment characteristic; and a fourth camera that comprises a vehicle ride height measurement camera that measures ride height at a fender arch or wheel lip for headlamp aiming.

* * * * *